United States Patent [19]

Laauwe

[11] 4,057,177
[45] Nov. 8, 1977

[54] VALVED SQUEEZE BOTTLE FOR VISCOUS PRODUCTS

[76] Inventor: Robert H. Laauwe, 237 Green Ridge Road, Franklin Lakes, N.J. 07417

[21] Appl. No.: 760,384

[22] Filed: Jan. 18, 1977

[51] Int. Cl.$^2$ .................. B65D 25/52; F16K 17/18
[52] U.S. Cl. .................. 222/215; 137/493.1; 137/859; 222/481.5; 222/493
[58] Field of Search .............. 222/491, 492, 493, 494, 222/495, 496, 497, 479, 481, 481.5, 215; 137/493, 493.1, 853, 859

[56] References Cited
U.S. PATENT DOCUMENTS
1,709,948  4/1929  Proctor .................. 222/494

Primary Examiner—Stanley H. Tollberg
Assistant Examiner—Hadd Lane
Attorney, Agent, or Firm—Kenyon & Kenyon, Reilly, Carr & Chapin

[57] ABSTRACT

A valved squeeze bottle for viscous products has a valve comprising two plastic parts cooperatively forming a chamber into which the viscous product can be squeezed by squeezing the squeeze bottle, to elastically separate the parts which together form a sleeve valve opened by the separation of the parts and which recloses when the bottle squeeze pressure is released so the parts return, one of the parts forming a check valve permitting entrance of air into the bottle. The squeeze bottle and the valve parts are made of elastically deformable plastic which after being deformed, springs back to its original shape.

9 Claims, 12 Drawing Figures

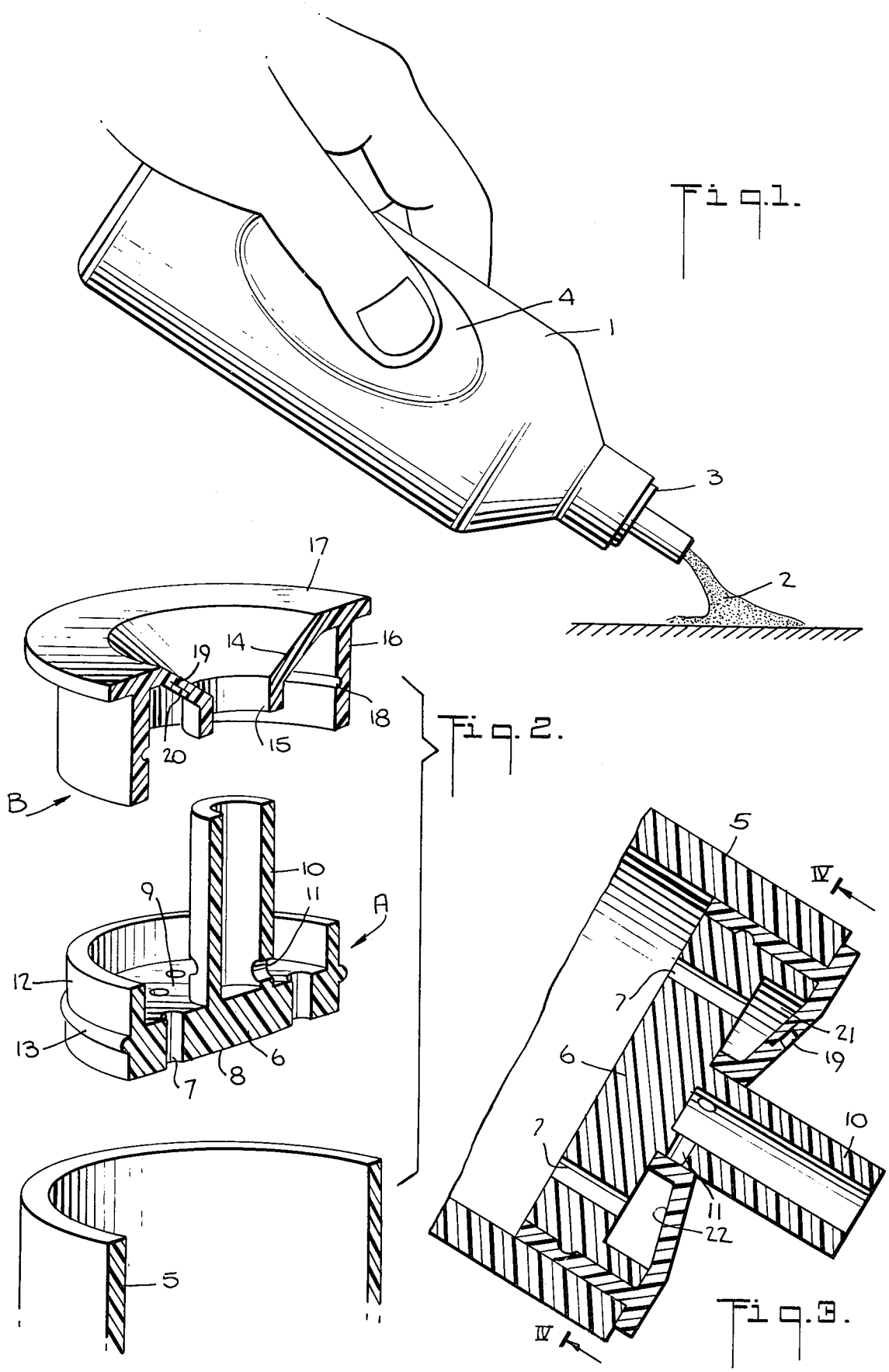

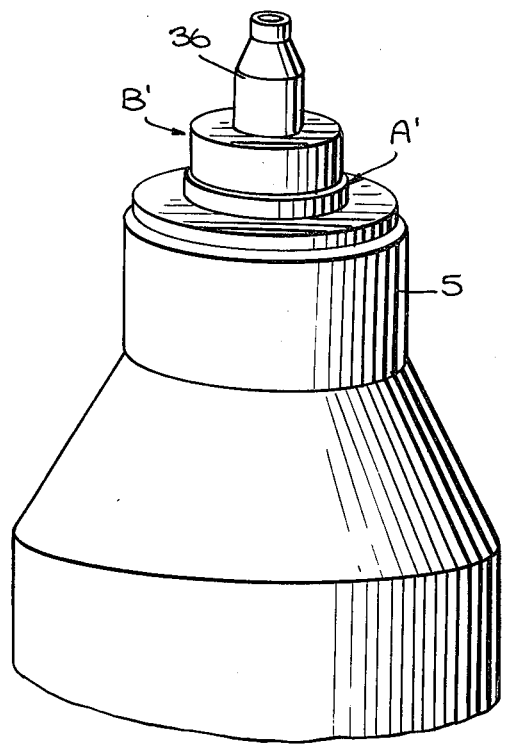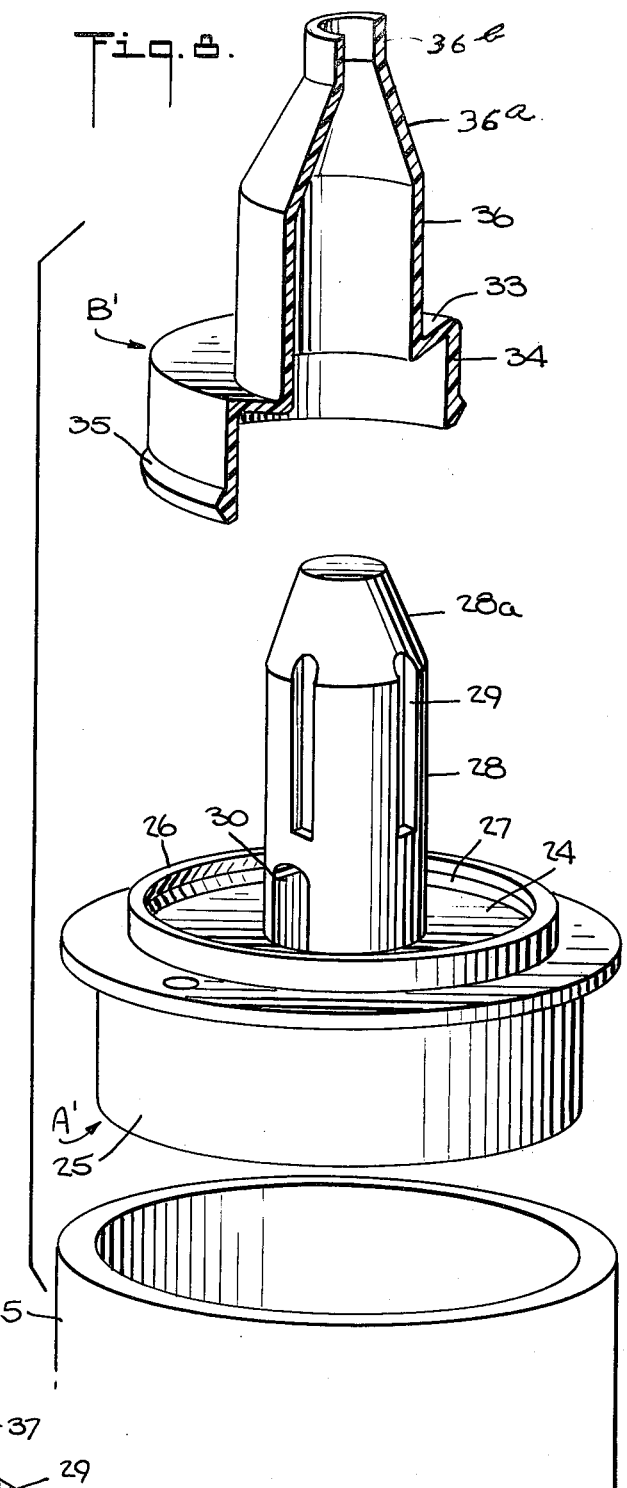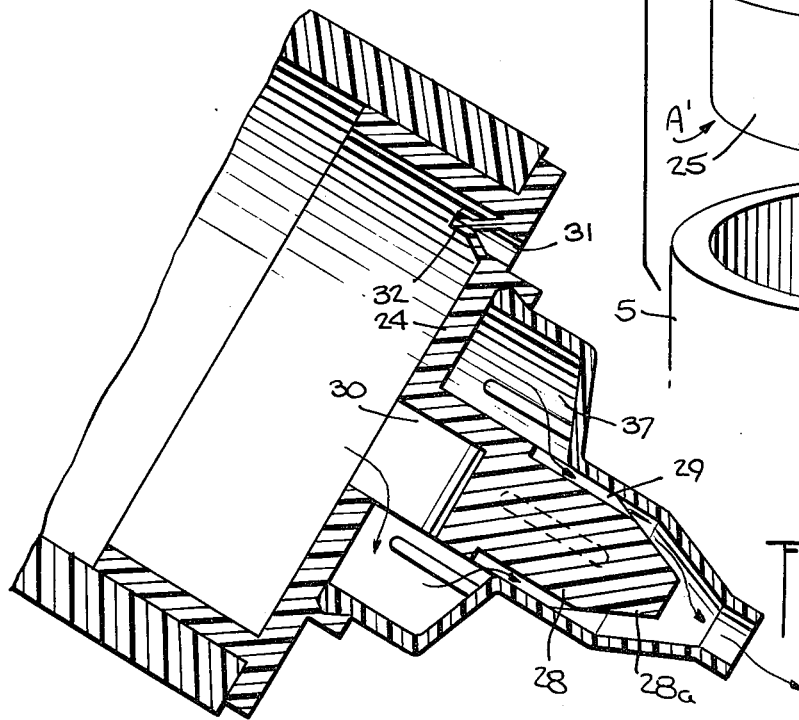

VALVED SQUEEZE BOTTLE FOR VISCOUS PRODUCTS

BACKGROUND OF THE INVENTION

Squeeze bottles are used to package and dispense various kinds of products. Such a bottle is made of elastically deformable plastic, and when manually squeezed to dispense its contents, resiliently springs back to its original shape upon release of the squeeze pressure. This permits the bottle to be made with a predetermined shape which except while the bottle is squeezed, is retained throughout the useful life of the bottle. The bottle shape is used to identify the source of the bottled product and to appeal to the aesthetic sense of the user.

When such a squeeze bottle is used to package and dispense viscous products, exemplified by viscous hair shampoos and detergents, mustard, ketchup, etc., its mouth has been provided with a manually operated valve arrangement because the more convenient dispensing valves of prior art construction cannot handle viscous products. A dispensing valve opens and closes automatically dependent on the pressure of a liquid product controlled by the valve.

For the merchandizing of viscous products packaged in squeeze bottles, millions of the bottles may be involved. Manufacturing cost per bottle is important. If the bottle is to be provided with a dispensing valve, the valve must not only be effective so it recloses adequately tightly after the bottle is squeezed, but it also must be made of as few parts as possible with the parts capable of production at low cost and involving the least possible assembly cost. Preferably like the bottle itself, the parts should be capable of being made of plastic. The valve must provide for venting the bottle so that after the bottle is released from squeeze pressure it can spring back with reasonable promptness to its original shape through its elastic recovery properties, by permitting the bottle to suck in air to replace the product squeezed from the bottle.

One example of a possible squeeze bottle valve is provided by the Mancusi Jr. Pat. No. 3,206,079, Sept. 14, 1965. As stated by this patent, the construction it discloses represents a determined effort to provide a simplified dispensing valve which vents after product-dispensing is released. However, this patented valve construction involves the use of three parts which must be separately manufactured, the bottle mouth itself forming a necessary fourth part, and the valve action is effected by flexing a spring disk or diaphragm having inner and outer peripheries which seat on annular valve seats. To handle viscous products, the product would have to be squeezed from between the disk and seal by the spring-back of the disk to effect a closure, and the spring disk cannot provide any large force for this purpose.

Although unfitted for use with a squeeze bottle which must spring back to its original shape repeatedly, the Nilson Pat. No. 3,981,419, Sept. 21, 1976, does disclose a simple valve made of two plastic parts, an outer part being elastically deformable outwardly when receiving the force of a pressurized product, this outer part unsealing a valve head formed by an inner part. However, in this case also, an annular valve seat is involved, and if this patented construction is to be used to handle a viscous product, closing action is uncertain because of the need for the valve to squeeze the product from between annular surfaces when the valve-opening product pressure is released. No container venting action is provided.

Insofar as is known, the prior art has not provided a squeeze bottle having a dispensing valve capable of handling viscous products, which is of simple construction permitting low-cost manufacture and assembly in large quantities, which automatically opens and closes when the squeeze bottle is squeezed and released, and which when closed, positively seals the squeeze bottle contents against loss when the bottle having the valve is tilted or inverted either during shipment or use, and having a construction permitting the incorporation of a check valve for venting the bottle and which can be made as an integral part of the valve.

SUMMARY OF THE INVENTION

According to the present invention, the squeeze bottle is of the type that springs back to its original shape when squeezed and released from squeeze pressure. It may be made of any of the elastically deformable plastics commonly used for the manufacture of such a squeeze bottle. The contour and shape of the bottle may be as desired to identify the source of the product bottled or possibly solely to provide an aesthetic appearance. The bottle can have the usual neck with a mouth through which the bottle may be filled with the viscous product and from which the product is dispensed.

This bottle has its mouth closed by a dispensing valve entirely capable of operating successfully when the bottle contains a viscous product which, as previously indicated, can be exemplified by hair shampoo, viscous detergents, ketchup, mustard, and many other products which are normally considered to be too viscous to be handled successfully by dispensing valves of the prior art when capable of being mass produced in large quantities at low cost.

In the case of the present invention, the bottle's mouth is closed by a dispensing valve comprising superimposed inner and outer parts. Only these two parts are required and they may be made of any of the usual elastically flexible plastics as exemplified by high density polyethylene.

The inner part closes the bottle mouth excepting that it has one and preferably a number of flow passages extending from its inside to its outside so that when the bottle containing a viscous product is squeezed, the product can be squeezed through the inner part to its outside. In addition, the inner part has a projection extending outwardly from its outside and having a side in which at least one and preferably more flow passages are formed. If the projection is tubular, the flow passages may be holes formed adjacent to the outside of the inner part and extending transversely into the inside of the tubular projection for flow internally through the projection with the latter then forming a dispensing nozzle. If the projection is in the form of a solid post, the passages may have longitudinally extending grooves formed in the outside of the projection.

In either case the outer part has an elastically flexible diaphragm surrounding the above projection with the diaphragm forming a tubular neck or sleeve slidably fitting the projection and covering and closing either the abovementioned holes or the grooves when the diaphragm is unflexed or unstrained but uncovering and opening the same by sliding axially on the projection when the diaphragm is elastically flexed outwardly.

Preferably the projection and the sliding neck or sleeve have cylindrical contours.

Like a so-called Belleville spring washer, the diaphragm is contoured either conically or convexly so that it acts in its axial direction as a spring with its tubular neck or sleeve covering the flow passages or passages formed in the side of the projection of the first part. If the projection is solid with the grooves in its side, the tubular neck may be extended over and beyond the projection so that the neck forms a dispensing nozzle.

By using only the two parts, a sleeve valve action is provided which is easily capable of handling viscous products of the type previously described. When the diaphragm is flexed outwardly, its tubular neck or sleeve slides on the projection so that a viscous product can be squeezed through the valve. When the squeeze pressure is released from the viscous product, and when only the elastic recovery or springback force of the flexible diaphragm is available for closing the valve, the neck slides back on the projection with a sleeve valve action shaving off the viscous material ahead of the neck as the latter easily returns to its closing position. Little force is needed to provide for complete closing of the valve, and when closed, the sleeve valve parts provide for substantially complete sealing or closing action.

The two parts form a space between the outside of the inner part and the inside of the diaphragm into which, when the bottle is squeezed, the viscous product in the bottle is squeezed via the passages in the inner part to apply pressure between the outside of the inner part and the inside of the diaphragm. The pressure of the viscous product squeezed into this space is exerted in all directions, including against the inside of the diaphragm, this causing the latter to flex outwardly and slide the tubular neck on the projection for the valve opening operation. The diaphragm being made of elastically deformable plastic, is made with a thickness permitting its flexure outwardly and so that acting like a Belleville spring, it inherently springs back to its original unflexed condition with its tubular neck covering and closing the passages formed in the projection, when the product in the valve space and bottle is released from squeeze pressure.

For venting the bottle, one of the two parts of the valve forms an inwardly opening check valve so that after release of the squeeze pressure, air can replace product squeezed from the bottle and permit the latter to spring back to its unsqueezed shape and the diaphragm to spring back to its unflexed condition closing the valve.

Both the inner and outer parts can be made of elastically flexible plastic capable of being injection molded into the two parts separately. Furthermore, the part provided with the check valve can be injection-molded to integrally provide the check valve with elastically displaceable parts providing the check valve operation permitting air to enter the bottle when necessary while closing when the bottle is squeezed so that pressure is exerted on the viscous product in the bottle.

When the viscous product is squeezed through the passages in the inner part into the space formed between the two parts, the pressure in this space is substantially equal and opposite in all directions, and the pressures on the inner part's inside and outside are not greatly different because the product being squeezed from the bottle exerts pressure on the inside of the inner part providing a substantial reaction to the force exerted by the product, under pressure in the space, on the outside of the inner part. The differential pressure on the inner part when the product is under squeeze pressure depends on the total cross-sectional area of the flow passages formed through the inner part, and the cross-sectional area of the dispensing flow passage or passages through which the product leaves the space between the two parts.

BRIEF DESCRIPTION OF THE DRAWINGS

Specific examples of two forms of the invention briefly described above, are illustrated by the accompanying drawings, in which:

FIG. 1 is a side view showing a first form of the new squeeze bottle as it is manually squeezed to dispense a content of viscous product through the bottle's dispensing valve;

FIG. 2 is an exploded view showing the valve's inner and outer parts and the bottle neck, partly in perspective and partly in longitudinal section;

FIG. 3 is a longitudinal section showing the parts assembled and the valve in its closed position;

FIG. 7 shows a second form of the invention, this being a perspective view;

FIG. 8 is like FIG. 2 but shows the second form;

FIG. 9 in longitudinal section shows this second form as the valve appears in its open position;

DETAILED DESCRIPTION OF THE INVENTION

Figure 4:
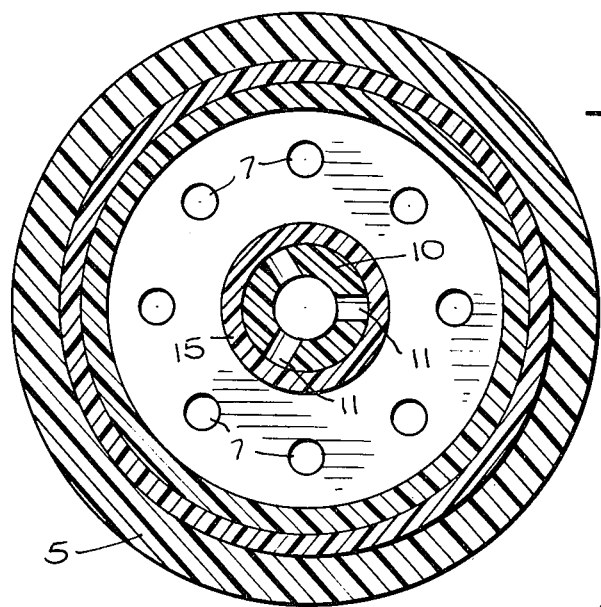
FIG. 4 is a cross section taken on the line IV—IV in FIG. 3.

In the above drawings FIG. 1 shows the new squeeze bottle in a first form, the construction of which is illustrated in detail by FIGS. 2 through 6.

In FIG. 1 the bottle 1 is being squeezed with the viscous product 2 discharging through the bottle's dispensing valve 3, the user's fingers squeezing the bottle so that it is inwardly distorted or deformed at 4. The bottle is made of elastically deformable plastic so that as soon as the finger pressure is removed, the deformed portion 4 springs back with the bottle then regaining its original shape. Because the valve 3 is a dispensing valve, it promptly closes when the squeeze pressure is terminated. Therefore, the bottle can be in any position during shipment and need not be stored upright by the user.

In FIG. 2 the mouth of the squeeze bottle is shown at 5. The valve's inner part A is an integral injection molding of suitable plastic which is preferably elastically deformable, such as high-density polyethylene. This molding is in the form of an annular disk 6 through which an annular series of holes 7 is formed so that these holes form product flow passages extending from this part's inside 8 to its outside 9. The previously referred to projection is in the form of a tube 10 that extends at right angles outwardly from the outside 9 sufficiently far to function as a dispensing nozzle. An annular series of holes 11 is formed transversely through the wall of this tubular projection 10 at a location adjacent to the outside 9 of the disk 6. Peripherally the disk 6 has an axially outwardly extending flange 12 and an annular radially projecting rib 13.

The holes 7 form a first set of product flow passages and the holes 11 form a second set of product flow passages.

The valve's outer part B is also an integral injection molding and in this case it must be made of elastically deformable or flexible plastic, high density polyethylene again providing a suitable example.

It is this outer part B that forms the flexible diaphragm referred to, shown here at 14, shaped to surround the projection 10 and having the previously referred to tubular neck 15 which is shown here as extending inwardly from the diaphragm 14, and which slidably fits the projection 10. This diaphragm 14 is elastically flexible, being shown in its relaxed or unstrained condition in FIG. 2, and is designed to act in the manner of a so-called Belleville spring washer. This part B has an inwardly extending annular skirt 16 extending from an annular radial flange 17 with an inner periphery which extends radially inwardly in the form of the spring diaphragm 14, the skirt 16 having an inner annular groove 18 which snaps over the rib 13 of the part A when the two parts are assembled.

As a relief valve, a small hole 19 is formed through the spring diaphragm 14 which is at that location slit to form a small flap 20 which normally closes the hole 19 against outward fluid flow while permitting air to flow through the hole 19 inwardly by the flap flexing inwardly.

In FIG. 3 these two molded parts A and B are shown assembled together and in the mouth 5 of the squeeze bottle. The assembly operation consists simply of pushing the skirt 16 over the periphery of the part A with the rib 13 and groove 18 snapping together, the valve then being frictionally pushed into the bottle mouth 5 so that the entire assembly of the bottle is completed. This assembly would ordinarily be done after the bottle is filled with the viscous product to be dispensed. If a press fit is considered inadequate, the skirt 16 can be adhesively secured in the bottle mouth or the outside of the skirt and the inside of the mouth may be provided with a rib and groove interlock of the type represented by the rib 13 and groove 18.

Figure 5:
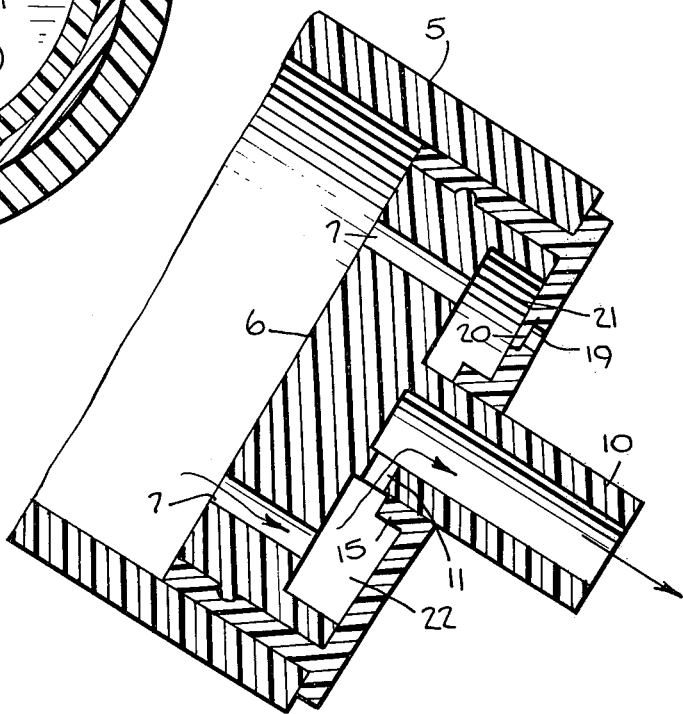
FIG. 5 is like FIG. 3 but shows the valve in its open position.
Figure 6:
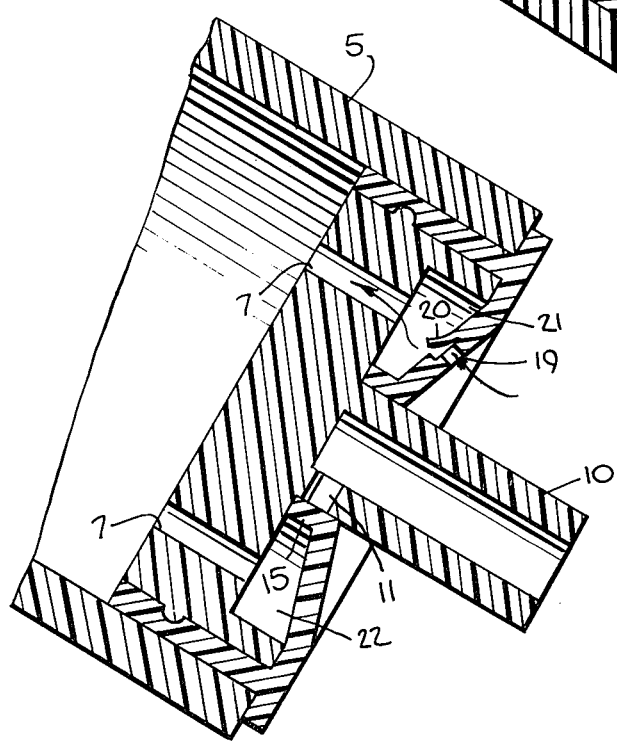
FIG. 6 is like FIG. 3 but shows the valve closed and venting with air entering the bottle to permit the bottle to spring back to its original contour.

Now it can be seen that from FIG. 3 that when assembled, the two parts form a space 21 between the outside 9 of the inner part A and its flange 12, and the inside 22 of the diaphragm of the outer part B. When the bottle is squeezed, a viscous product in the bottle squeezes through the first passages 7 into the space 21, fills the space 21 and then applies pressure between the outside 9 of the inner part and the inside of the diaphragm to force the latter to flex outwardly and slide its sleeve 15 on the projection 10 outwardly so as to uncover and open the second passages 11, the product then flowing through the tubular projection 10 which functions as a dispensing nozzle, all as is illustrated by FIG. 5. During this action, the flap valve 20 is pressed closed against the hole 19 as can be seen from this FIG. 5.

During this dispensing action effected by squeezing the bottle as shown by FIG. 1, the fluid pressure in the space 21 is exerted in all directions against the insides of the surfaces forming this space 21. This means that the tubular neck 15 is pressed radially against the outside of the tubular projection 10, so that while the viscous product is under pressure in the space 21 and squeezing through the inside of the projection 10 there is little chance for leakage of the product via the now open sleeve valve formed by the parts 15 and 10. At the same time, the axially extending flange 12 of the inner part is pressed outwardly to press the skirt 16 of the outer part against the inside of the bottle mouth. All of this occurs during the squeezing action while the viscous product is necessarily under pressure in the space 21.

However, when the squeezing pressure is released on the squeeze bottle 1 and the latter attempts to spring back to shape, the pressure in the valve's space 21 drops to and ordinarily below atmospheric pressure, thus causing the venting valve formed at 19 and 20 to open and permit air to flow into the space 21 so that the product in this space can be sucked along with the air back into the bottle and allow the latter to spring back to its original shape. At the same time the inward radial pressure previously applied by the viscous product under pressure in the space 21, is, of course, released from the surface 23 of the tubular neck 15 so that the latter can more easily be slid back over the holes or second passages 11, by the elastic recovery or spring-back action of the spring diaphragm 14. As the sleeve 15 slides back to its closed position, it can easily shave off or push aside viscous product on the projection 10 so that the valve closes positively. These factors substantially reduce the need for the spring diaphragm to exert a large spring-back force.

When the valve is closed, it need only be secure enough to prevent the viscous product from escaping under the gravity force on the product, the latter being then free from the squeeze pressure. Being a sleeve valve, this valve effectively seals the viscous product in the bottle even when the latter is shaken. The valve can open only by squeezing the bottle.

The form of this invention, illustrated in detail by FIGS. 7 through 12, represents what is at present considered to be the best mode of carrying out the present invention.

Figure 12:
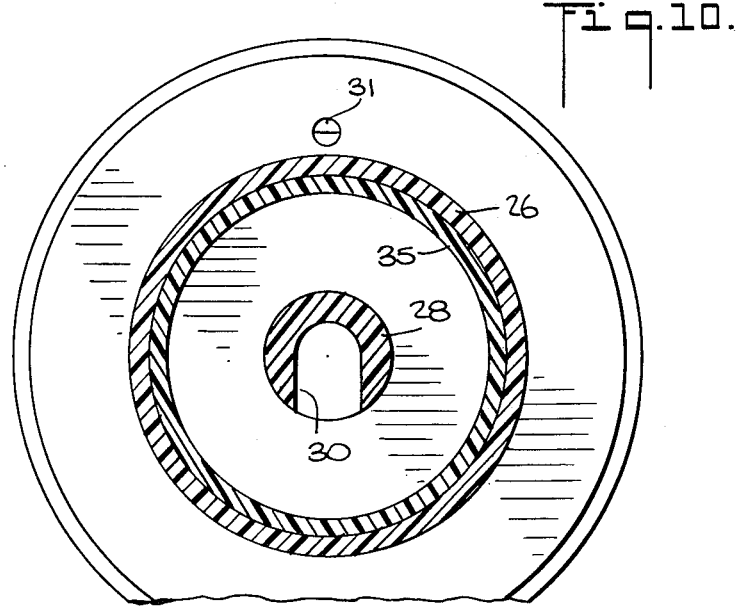
FIG. 12 is a cross section taken on the line XII—XII in FIG. 10.
Figure 11:
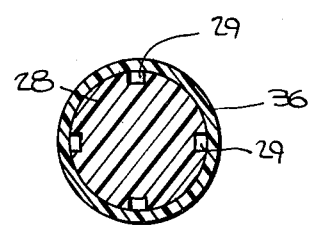
FIG. 11 is a cross section taken on the line XI—XI in FIG. 10.

In this second form the inner part A', again an integral plastic injection molding of suitable plastic such as the one previously mentioned, comprises a flat disk 24 having an axially inwardly extending annular skirt 25 which fits directly within the bottle mouth 5 where the skirt can be secured as discussed in connection with the skirt 16 of the first form. An axially outwardly extending flange 26 extends from the outside of the disk 24, this flange 26 being of substantially smaller diameter than the skirt 25 and internally having an annular groove 27. As in the case of the first example, a projection 28 extends centrally from the disk 24, in this case the projection extending outwardly in the form of a solid post in the side of which an annular series of axially or longitudinally extending grooves 29 are formed, starting from a position spaced outwardly from the disk 24 and extending to the outer end of the projection. These grooves form the second product flow passages, the first product flow passage between the inside and outside of the disk 24 being formed by a passage 30 which opens adjacent to the outside of the disk 24 and which, as shown by FIGS. 9 and 12, for example, opens centrally from the inside of the disk 24 in an axial direction and then turns right angularly to open from the side of the projection 28 at a position between the inner ends of the grooves 29 and the outside of the disk 24. This first passage is shown as having only one opening in the side of the projection 28 but possibly it could open transversely at one or more other positions which are circumferentially interspaced.

Figure 10:
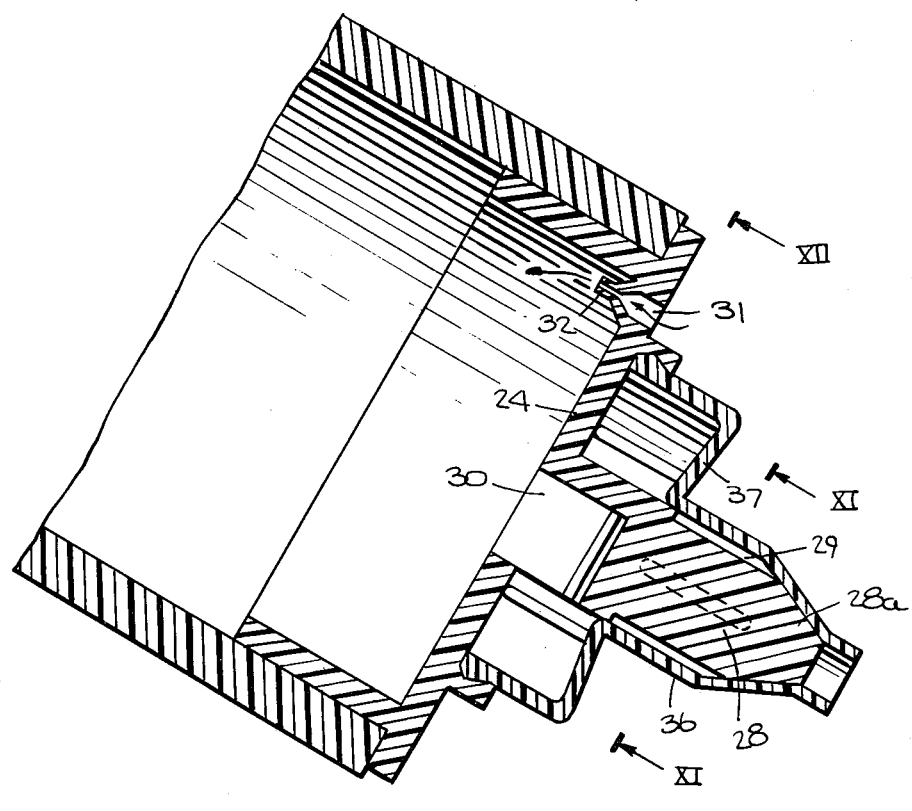
FIG. 10 shows this second form in longitudinal section and as the parts appear when the valve is closed, this view indicating the venting action which occurs as the bottle springs back to its original shape.

In this second and presently preferred form the pressure relief valve is formed through the disk 24 between the flange 26 and the inside of the skirt 25 and, as shown by FIGS. 9 and 10, for example, it can be integrally molded with the balance of the inner part A', in the form of a so-called duck-bill type of valve. In other words, the disk 24 is formed at the described location with a hole 31 with the plastic extending in the form of a small relatively thin-walled inwardly projecting part or parts 32 together forming a general tubular configuration and which may be longitudinally slit from its inner end so that when receiving outward pressure from the viscous product, it collapses and closes, but elastically springs open to permit the necessary reverse flow of air required for venting the bottle. In this case the venting is directly to the inside of the bottle. This type of valve gets its name from the fact that in operation it simulates the opening and closing of a duck's bill. These vent valve parts or part can be formed during the injection molding of the inner part.

The outer part B' is formed with its elastically deformable diaphragm or Belleville spring type part 33 integrally provided with an axially inwardly extending skirt 34, extending from the outer periphery of the element 33, which inwardly terminates with an outwardly extending radial rib 35. This skirt 34 fits within the flange 26 so that the rib 35 snaps within he annular groove 27 of the flange 26. From the inner periphery of the diaphragm portion 33 the necessary tubular neck or sleeve 36 extends axially outwardly so as to slidably cover the projection 28 at a location starting just below or inside of the grooves 29, as shown by FIG. 10, when the diaphragm 33 is unstrained or relaxed. In this case the sleeve 36 is long enough to completely cover the projection 28 and extend beyond its tapered outer end with a corresponding tapered portion 36a, terminating outwardly therebeyond in the form of a dispensing nozzle 36b. This nozzle portion 36b can be eliminated if it is found to entrap too much of the product.

With this preferred form of the invention, when the squeeze bottle is squeezed, the product squeezes through the first passage or passages 30 into the space 37 formed by the parts between the outside of the disk 24 of the inner part and the inside of the diaphragm portion 33 of the outer part and its skirts 34. As pressure develops in this space 37, the spring diaphragm or Belleville washer type section 33 elastically springs outwardly with the sleeve 36 sliding outwardly so as to uncover the inner ends of the grooves 29 of the inner part A', the viscous product then flowing through the grooves 29 forming the second passages and on out through the dispensing nozzle formed at 36b.

When the squeeze bottle pressure is released, the sleeve valve closes as shown by FIG. 10, the venting valve opening to admit air to the bottle. The tapered portion 36a of the outer part can be made to fit the outer tapered end 28a of the projection 28 of the inner part to avoid the small amount of dribbling that might be potentially possible due to viscous product remaining in the portions of the grooves 29 outwardly beyond their inner ends closed by the valve action, as shown by FIG. 10.

The parts of the relief valve, which can be called the duck bill 32, are formed to normally close the venting hole 31 so that gravitational loss of the viscous product when the bottle is tilted or inverted, is prevented. A normal squeeze bottle, when elastically recovering its shape, can draw an adequate suction to force the duck bill parts 32 to open slightly for venting and to thereafter promptly close when the bottle has fully retained its original shape.

It can be seen that in both forms of this invention only two integrally injection molded plastic parts are necessarily involved, and that the two parts are made so that for assembly they need only be snapped together. The bottle mouth itself is not relied on, the two parts forming a self-contained dispensing valve. In spite of this great simplicity, at the same time a valve is provided which works on the sleeve valve principle, thus permitting the valve to handle the viscous type of fluids previously indicated, in a reliable manner.

This invention makes possible the production and merchandizing of squeeze bottles in the great quantities demanded, containing viscous products, and having dispensing valves which automatically open and close when the bottles are squeezed and released. The need for manually operated valve arrangements has been eliminated.

What is claimed is:

1. A squeeze bottle for containing and dispensing a viscous product and which is made of elastically deformable material so that after the bottle is squeezed and released from squeezing pressure, the bottle inherently springs back to its original unsqueezed shape, said bottle having a mouth provided with a dispensing valve comprising superimposed inner and outer parts normally closing said mouth, said inner part having at least one first product flow passage extending from its inside to its outside and a projection extending outwardly from its outside and the projection having a side in which at least one second product flow passage is formed, said second passage communicating with the outside of said valve and said outer part having a flexible diaphragm surrounding said projection and having a tubular neck slidably fitting the projection and normally covering and closing said second passage when the diaphragm is unflexed but uncovering and opening the second passage by sliding axially on the projection when the diaphragm is flexed outwardly, said parts forming a space between the outside of said inner part and the inside of said diaphragm into which when said bottle is squeezed a viscous product in the bottle can be squeezed via said first passage to apply pressure between the outside of the inner part and the inside of the diaphragm to cause the latter to flex outwardly and slide said tubular neck on said projection so as to uncover and open said second passage, said diaphragm being made of elastically deformable material and so that it inherently springs back to its original unflexed condition with said tubular neck covering and closing said second passage when the product in said space and bottle is released from squeeze pressure, one of said parts having an inwardly opening check valve for venting said bottle so that after release of squeeze pressure on the bottle air can replace product squeezed from the bottle and permit the latter to spring back to its unsqueezed shape and said diaphragm to spring back to its unflexed condition.

2. The bottle of claim 1 in which said inner and outer parts are each formed by an integral plastic molding and the parts are interconnected, at least said outer part being made of elastically flexible plastic.

3. The bottle of claim 2 in which said projection has an axially extending passage and forms a product dispensing nozzle, said second product flow passage being formed by said axially extending passage via at least one transverse hole opening thereto through said projection adjacent to said first part's outside, and the diaphragm's said tubular neck is shorter than said projection and covers and uncovers said hole when slid on the projection by the action of said diaphragm.

4. The bottle of claim 2 in which said projection forms said second product flow passage via at least one longitudinally extending groove in its outer side surface, and the diaphragm's said tubular neck forms a product dispensing nozzle, at least an inner end of said groove being covered and uncovered by at least an inner portion of the said neck when the latter is slid on the projection by the action of said diaphragm.

5. The bottle of claim 2 in which at least one of said parts forms an axially extending annular wall by which said diaphragm is spaced from the outside of said inner part to thereby define the aforesaid space.

6. The bottle of claim 5 in which said wall is formed by said outer part and said inner part has an axially outwardly extending flange in which said wall is fitted, product squeezed into said space applying outwardly radially directed pressure to said wall pressing the wall radially against said flange.

7. The bottle of claim 5 in which an annular rib and groove interconnection is formed by said wall and flange.

8. The bottle of claim 6 in which said projection has a conical outer end and said extended tubular neck has a conical portion which fits on said outer end when said diaphragm is in unflexed condition.

9. The bottle of claim 2 in which said tubular neck has an outside exposed to said space and receiving said pressure applied by said viscous product.

* * * * *